(12) United States Patent
Thomas et al.

(10) Patent No.: US 8,363,668 B2
(45) Date of Patent: Jan. 29, 2013

(54) AVOIDING UNFAIR ADVANTAGE IN WEIGHTED ROUND ROBIN (WRR) SCHEDULING

(75) Inventors: Sarin Thomas, Sunnyvale, CA (US); Srihari Vegesna, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 435 days.

(21) Appl. No.: 12/640,417

(22) Filed: Dec. 17, 2009

(65) Prior Publication Data

US 2011/0149977 A1 Jun. 23, 2011

(51) Int. Cl.
*H04L 12/56* (2006.01)
(52) U.S. Cl. ........................................ 370/412
(58) Field of Classification Search .............. 370/229, 370/252, 412
See application file for complete search history.

(56) References Cited

U.S. PATENT DOCUMENTS

| 2005/0147034 A1* | 7/2005 | Zhao et al. | 370/229 |
| 2007/0104210 A1* | 5/2007 | Wu et al. | 370/412 |
| 2010/0014428 A1* | 1/2010 | Naven et al. | 370/237 |

* cited by examiner

*Primary Examiner* — Jianye Wu
*Assistant Examiner* — Wanda Z Russell
(74) *Attorney, Agent, or Firm* — Harrity & Harrity, LLP

(57) ABSTRACT

A network device includes multiple queues to store packets to be scheduled, and a weighted round-robin (WRR) scheduler. The WRR scheduler performs a first WRR scheduling iteration including processing of at least one packet from a particular queue of the multiple queues, identifies the particular queue as an empty queue during the performing of the first WRR scheduling iteration, identifies the particular queue as a non-empty queue after the identifying the particular queue as the empty queue, and performs a second WRR scheduling iteration including processing of only one packet of a group of packets from the particular queue of the multiple queues.

19 Claims, 8 Drawing Sheets

AVOIDING UNFAIR ADVANTAGE IN WEIGHTED ROUND ROBIN (WRR) SCHEDULING

BACKGROUND

In order to control their high packet throughput, network devices (such as routers) use memory buffers to temporarily queue packets waiting to be processed based upon predefined criteria, such as relative weight or priority. A scheduler may control the dequeuing of packets from the buffer queues. One well-known scheduling methodology is referred to as Weighted Round Robin (WRR) scheduling. In WRR scheduling, each queue is assigned a relative weight. Each WRR weight may indicate a level of priority, in which the larger the WRR weight, the higher the priority. Transmission opportunities are allocated for each queue based upon the relative weights of the queues, using a round-robin technique to cycle between the queues.

When a queue becomes empty in the middle of a WRR cycle, the network device may move on to a next highest priority queue. If the empty queue receives additional packets before that queue is activated in the next WRR cycle, that queue will typically receive full WRR weight in the next cycle. As a result, a queue going empty and non-empty at a certain frequency may obtain an unfair advantage over other queues.

SUMMARY

According to one implementation, a network-device-implemented method may include initializing credit counters for each queue in a group of queues, performing weighted round-robin (WRR) scheduling of packets from one of the group of queues, identifying that the one of the group of queues is empty, and setting an indicator to prevent adding credits, during a subsequent initializing of the credit counters, to a credit counter associated with the empty one of the group of queues.

According to another implementation, a network device may include multiple queues to store packets to be scheduled and a WRR scheduler. The WRR scheduler may perform a first WRR scheduling iteration including processing of at least one packet from a particular queue of the multiple queues, may identify the particular queue as an empty queue during the performing of the first WRR scheduling iteration, may identify the particular queue as a non-empty queue after the identifying the particular queue as the empty queue, and may perform a second WRR scheduling iteration including processing of only one packet of a group of packets from the particular queue of the multiple queues.

According to yet another implementation, a network device may include means for means for initializing a credit counter for a particular queue in a group of queues, where the credit counter is initialized based on an assigned weighted round-robin (WRR) weight for the particular queue and where the particular queue includes one or more packets to be scheduled for processing; means for scheduling the one or more packets from the particular queue based on the initialized credit counter; means for identifying that the particular queue is empty; and means for setting an indicator to prevent adding, during a subsequent initializing of the credit counter, credits to the credit counter.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following description does not limit the invention.

The term "packet," as used herein, may refer to a packet, a datagram, a frame, or a cell; a fragment of a packet, a fragment of a datagram, a fragment of a frame, a fragment of a cell; or another type, arrangement, or packaging of data.

Implementations described herein may include systems and/or methods that provide a WRR scheduling scheme that minimizes a scheduling advantage that may occur when a queue cycles between an empty and non-empty state during WRR iterations. In one implementation, when a particular queue becomes empty, a flag may be set which indicates that no credits should be added to that particular queue for the next WRR scheduling iteration when that particular queue becomes active again. For all other queues, credits for the next iteration may be added in proportion to their WRR weights. The flag setting may force the particular queue that just went empty to send no more than a single packet in the subsequent WRR scheduling iteration, thus eliminating any unfair advantage. In subsequent WRR scheduling iterations, credits may again be added to all queues in proportion to their weight, which will ensure that a fair share for the particular queue is obtained.

Figure 1:
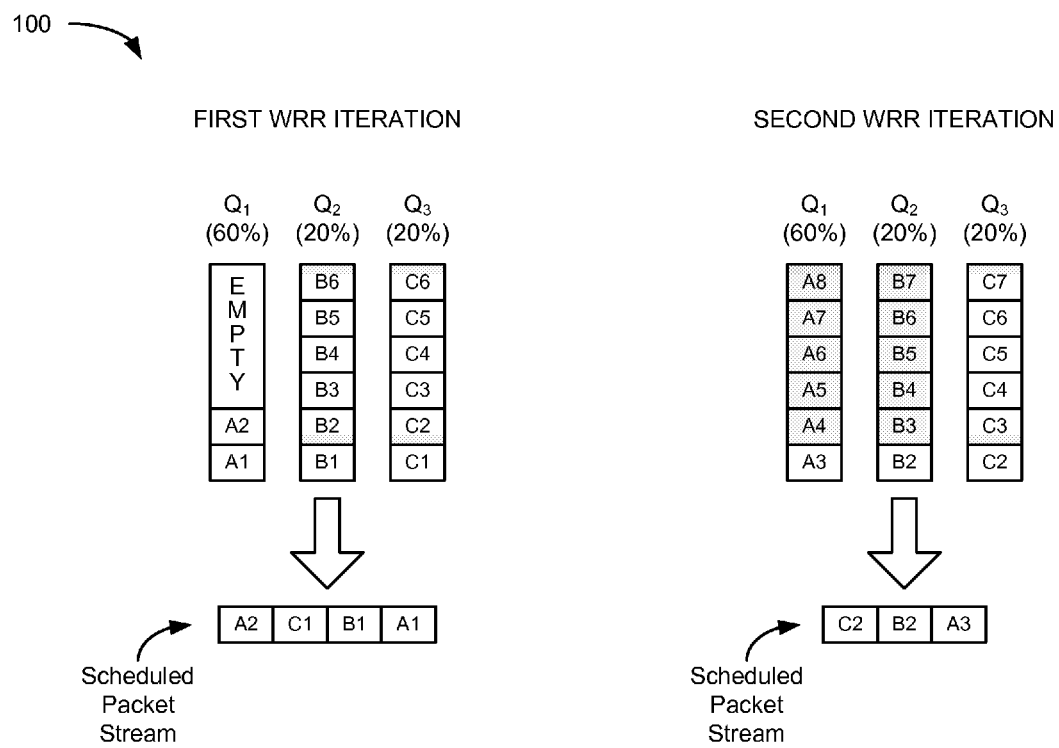
FIG. 1 is a diagram illustrating an overview of exemplary implementations described herein.

FIG. 1 is a diagram illustrating an overview of exemplary implementations described herein. As illustrated, a WRR scheduler for a network device may schedule (or de-queue) packets from a series of queues (e.g., $Q_1$, $Q_2$, and $Q_3$) based on assigned weights for each queue (e.g., 60%, 20%, and 20%) and an available bandwidth of 1000 bytes/ms. The WRR scheduler may run multiple iterations to generate a scheduled packet stream. In each WRR cycle, packets from each of the queues may be de-queued into a scheduled packet stream, where the order of the de-queued packets may be determined by credits assigned to each queue based on the weight.

Each of queues $Q_1$, $Q_2$, and $Q_3$ may be assigned credits to account for weights within the WRR framework. Credit counters may count down packets/bytes scheduled from each queue and may permit packets to be scheduled until the credit counter reaches a negative value. For example, a default setting may be that each queue (e.g., $Q_1$, $Q_2$, and $Q_3$) has no credits, allowing only a single packet to be scheduled per WRR iteration unless additional credits are assigned. In the example of FIG. 1, credits of 600, 200, and 200 may be assigned to queues $Q_1$, $Q_2$, and $Q_3$, respectively, for the first WRR iteration. Assume a relatively constant packet size of 400 bytes for queue $Q_1$, 210 bytes for queue $Q_2$, and 210 bytes for queue $Q_3$. Thus, two packets may be scheduled for retrieval from queue $Q_1$, and one packet may be scheduled for retrieval from each of queues $Q_2$ and $Q_3$, respectively, before the credit count for each queue goes negative. The credit count for queue $Q_1$ would go to −200, while the credit counts for queues $Q_2$ and $Q_3$ would each go to −10.

Assume, as shown in the first WRR iteration of FIG. 1, that queue $Q_1$ is emptied during the first WRR iteration. That is, packets A1 and A2 are removed from queue $Q_1$ into the scheduled packet stream during the first WRR iteration. When the WRR scheduler identifies that packet A2 is the last packet in queue $Q_1$, a flag may be set for queue $Q_1$ within the WRR scheduler to indicate that no credits should be added for the next iteration of WRR when queue $Q_1$ becomes active again.

Assume that credit counter for queue $Q_1$ is reset (e.g., upon becoming empty) and that more packets arrive in queue $Q_1$ after the WRR scheduler has finished scheduling packets from queue $Q_1$. During the second WRR iteration, no credits may be added to queue $Q_1$, and credits may be added to the other queues (e.g., queues $Q_2$, and $Q_3$) in proportion to their weights. In the example of FIG. 1, credits of 0, 190, and 190 may be assigned to queues $Q_1$, $Q_2$, and $Q_3$, respectively, for the second WRR iteration. The scheduled packet stream from the second WRR iteration may therefore include one packet from each of queues $Q_1$, $Q_2$, and $Q_3$, respectively, before the credit count for each queue goes negative.

Thus, the newly received packets at queue $Q_1$ may not be given an unfair advantage over previously received packets in queues $Q_2$, and $Q_3$. Particularly, by not adding credits to the empty queue $Q_1$ for one WRR iteration, queue $Q_1$ does not unfairly benefit from the zeroing out of its negative credit count upon going empty. Without this restriction, queue $Q_1$ would have been scheduled to send two 400-byte packets during the second iteration before reaching a negative credit count. In subsequent WRR iterations (not shown), credits may again be added to queue $Q_1$ in proportion to its assigned weight (e.g., 600).

It should be understood that the number of queues in FIG. 1, as well as their relative weights, are provided as examples only and may be manipulated in any desirable manner to meet the needs of the overall routing or forwarding system.

Exemplary Network Device Architecture

Figure 2:
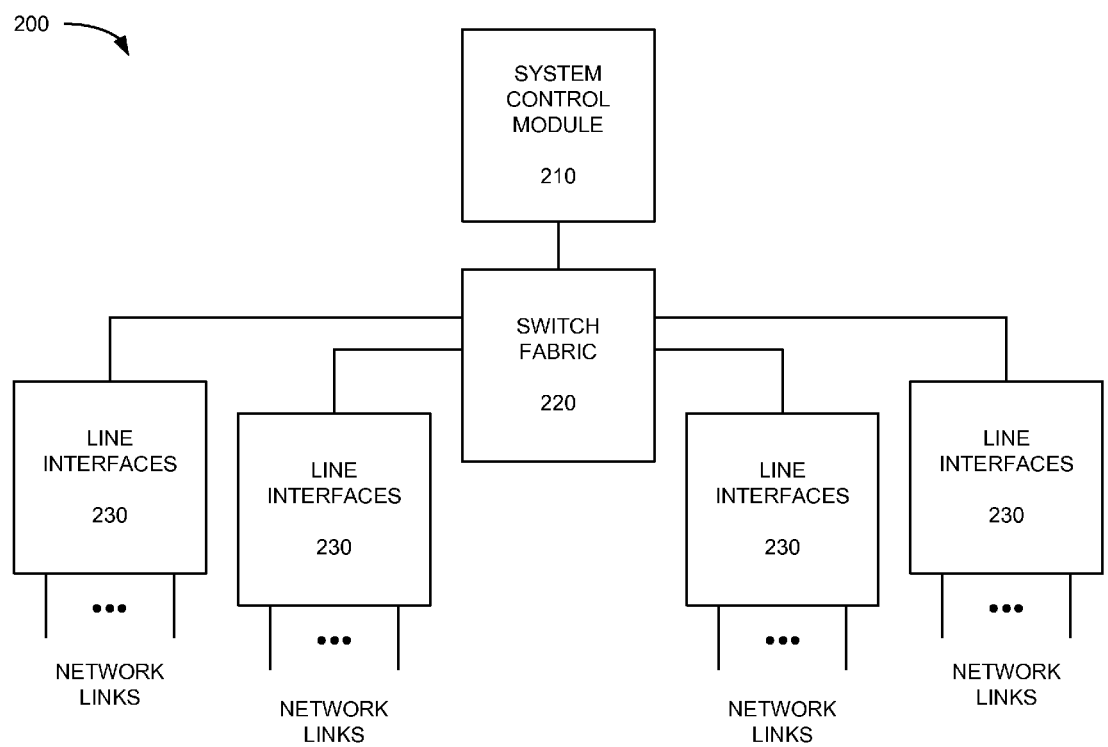
FIG. 2 is a diagram illustrating exemplary components of a network device depicted in FIG. 1.

FIG. 2 is a diagram illustrating exemplary components of network device 200. As illustrated in FIG. 2, network device 200 may include, for example, a system control module 210, a switch fabric 220, and a group of line interfaces 230.

System control module 210 may include one or multiple processors, microprocessors, application specific integrated circuits (ASICs), field programming gate arrays (FPGAs), and/or processing logic that may be optimized for networking and communications. System control module 210 may perform high level management functions for network device 200. For example, system control module 210 may communicate with other networks, devices, and/or systems connected to network device 200 to exchange information regarding network topology. In some implementations, system control module 210 may include a routing engine for creating routing tables based on network topology information, creating forwarding tables based on the routing tables, and sending these tables to interfaces 230 for data unit routing. System control module 210 may also include a static memory (e.g. a read only memory (ROM)), a dynamic memory (e.g. a random access memory (RAM)), onboard cache, and/or flash memory for storing data and/or machine-readable instructions.

Switch fabric 220 may include one or multiple switching planes to facilitate communication among interfaces 230 and/or system control module 210. In one implementation, each of the switching planes may include a single-stage switch or a multi-stage switch of crossbar elements. Switch fabric 220 may also, or alternatively, include processors, memories, and/or paths that permit communication among system control module 210 and/or interfaces 230.

Line interfaces 230 may include devices or assemblies, such as line cards, for receiving incoming packets from network links (or from other line interfaces 230) and for transmitting the packets to network links (or to other line interfaces 230). For example, line interfaces 230 may include wireless and/or wired interfaces, such as, Ethernet interfaces, optical carrier (OC) interfaces, and/or asynchronous transfer mode (ATM) interfaces. Line interfaces 230 may manage a set of input ports via which packets can be received and a set of output ports via which packets can be transmitted. Line interfaces 230 may include memory, one or more processors, and/or other logic.

Depending on the implementation, the components that are illustrated in FIG. 2 may provide fewer or additional functionalities. For example, if network device 200 performs an Internet Protocol (IP) data unit routing function as part of a Multiprotocol Label Switching (MPLS) router, system control module 210 may perform tasks associated with obtaining routing information from other routers in a MPLS network. In such cases, conveying network traffic from one interface to another may involve label-based routing, rather than IP address-based routing.

Network device 200 may perform operations and/or processes related to routing and/or switching. According to an exemplary implementation, network device 200 may perform these operations and/or processes in response to system control module 210 executing instructions contained in a computer-readable medium. A computer-readable medium may be defined as a physical or logical memory device. A logical memory device may include memory space within a single physical memory device or spread across multiple physical memory devices. The software instructions may be read into a memory from another computer-readable medium or from another device via interfaces 230. The software instructions contained in the memory may cause system control module 210 to perform processes that are described herein. Alternatively, hardwired circuitry may be used in place of or in combination with software instructions to implement processes described herein. Thus, implementations described herein are not limited to any specific combination of hardware circuitry and software.

Although, FIG. 2 illustrates exemplary components of network device 200, in other implementations, network device 200 may include additional, fewer, different, or differently arranged components than those illustrated in FIG. 2 and described herein. Additionally, or alternatively, one or more operations described as being performed by a particular component of network device 200 may be performed by one or more other components, in addition to or instead of the particular component.

Exemplary Line Interface Architecture

Figure 3:
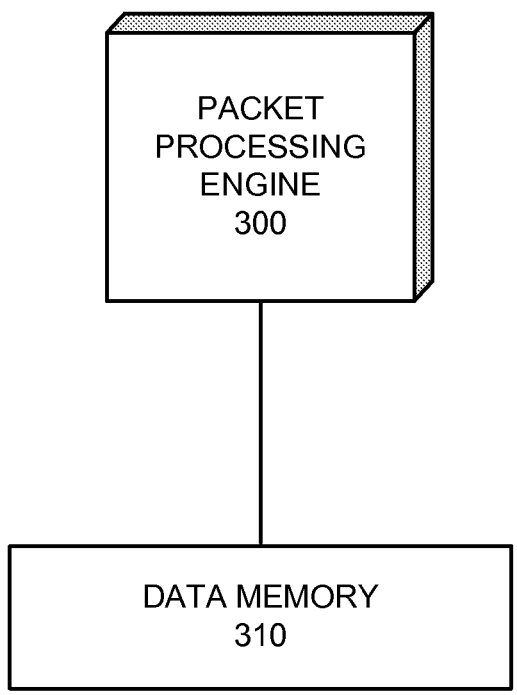
FIG. 3 is a diagram illustrating exemplary functional components of a line interface depicted in FIG. 2.

FIG. 3 is a diagram illustrating exemplary functional components of line interfaces 230. The functional components illustrated in FIG. 3 may be implemented by hardware (e.g., one or more processors or other processing logic, and one or more memories) or a combination of hardware and software. As illustrated, line interfaces 230 may include a packet processing engine (PPE) 300 and a data memory 310.

PPE 300 may provide for input, route lookup, and output processing of packets. PPE 300 may consult data memory 310 to perform routing lookups, classification of packets (e.g., for security purposes), policy-based routing, quality of service (QoS) routing, filtering of packets, and other forms of packet processing (e.g., packet statistical processing, accounting, and/or encapsulation). PPE 300 may perform one or more packet processing operations (e.g., packet parsing, route lookup, packet rewriting, next hop determinations, K-Tree determinations, and/or firewall determinations) based on, for example, microinstructions. The microinstructions may be generated by compiling source code for an application or part of an operating system (OS), such as, for example, Juniper Operating System (JUNOS), Cisco Internet Operating System (IOS), or the like. PPE 300 may execute the microinstructions in one or more processes or threads.

Data memory 310 may store various types of data related to packet processing. For example, data memory 310 may store a forwarding information base (FIB), a K-tree (e.g., a binary tree for route lookup), hash table data structures, counters, routing policies, and instruction sets (e.g., next hop instruction sets, K-tree instruction sets, etc.). In one implementation, data memory 310 may include a WRR table.

Although FIG. 3 illustrates exemplary functional components of line interface 230, in other implementations, line interfaces 230 may include fewer, different, differently arranged, or additional functional components than those depicted in FIG. 3. In still other implementations, one or more functional components of line interfaces 230 may perform one or more other tasks described as being performed by one or more other functional components of line interfaces 230. Additionally, PPE 300 and/or data memory 310 may be implemented in one or more components of network device 200, other than line interfaces 230.

Exemplary WRR Scheduling Architecture

Figure 4:
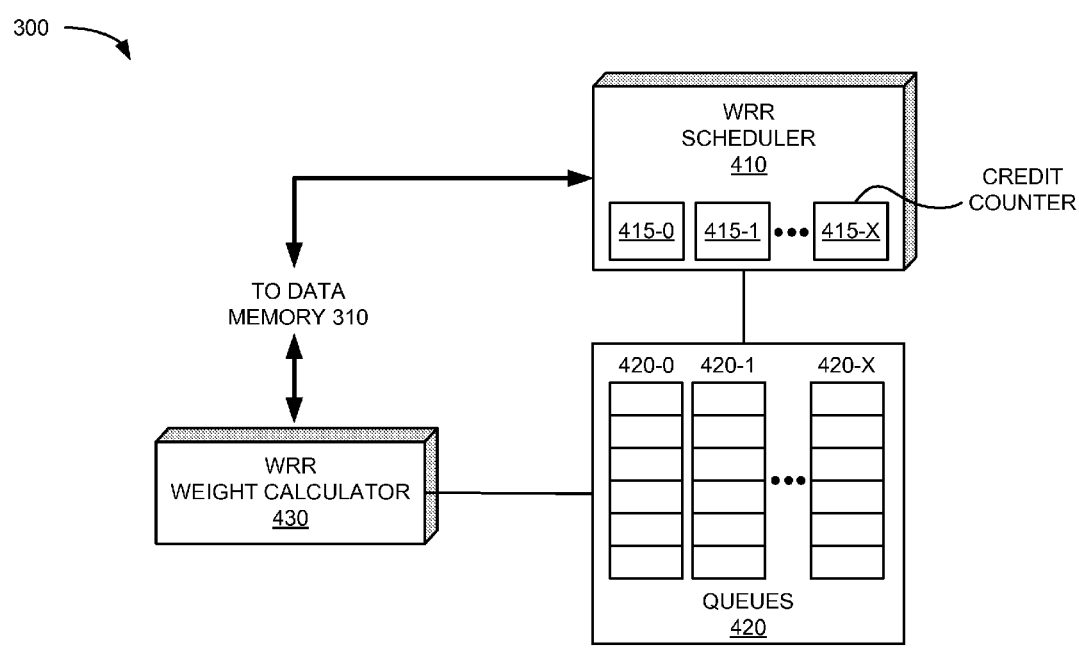
FIG. 4 is a diagram illustrating exemplary components of a packet processing engine (PPE) depicted in FIG. 3.

As previously described, network device 200 may process packets based on a WRR scheme. Provided below is a description of an exemplary WRR scheduling architecture in which the WRR scheduling scheme described herein may be implemented. FIG. 4 illustrates exemplary components of PPE 300. As illustrated, PPE 300 may include WRR scheduler 410, queues 420, and WRR weight calculator 430.

WRR scheduler 410 may include hardware or a combination of hardware and software that schedules the processing (e.g., forwarding decisions, transmit decisions, receive decisions, etc.) of packets in queues 420 based on WRR selection policies. WRR scheduler 410 may process the packets in queues 420 based on, for example, weight information obtained from a WRR table. As described further herein with connection to, for example, FIG. 5, the WRR table may include WRR weights associated with queues 420. In some implementations, WRR scheduler 410 may monitor the activity or inactivity of queues 420. In one implementation, WRR scheduler 410 may apply (or not apply) credits to counts for each of queues 420 based on the assigned weights.

WRR scheduler 410 may include one or more credit counters 415-0, 415-1, . . . 415-X (referred to herein collectively as "credit counters 415" and generically as "credit counter 415") (where X>1) to store a value indicating an amount of data eligible to be transmitted from an associated queue 420. WRR scheduler 410 may decrement a credit counter 415 when a packet from a queue 420 is added to a scheduled packet stream. If one of credit counters 415 is decremented below a predetermined level, WRR scheduler 410 may not schedule any more packets to be dequeued from the queue 420 associated with the credit counter 415. Credit counters 415 may be replenished (incremented), for example, at the beginning of each WRR iteration. Each credit counter 415 may reflect the next packet selection order and the history of actual selection from each queue.

Queues 420 may include one or more memory components that store packets for processing (e.g., forwarding decisions and scheduling). Queues 420 may correspond to, for example, receiver-side buffers and/or transmitter-side buffers. As illustrated, queues 420 may include queues 420-0 through 420-X. Packet data may flow through queues 420, where each queue may have an assigned weight associated with its relative priority. A packet that reaches the head position in its respective queue 420 may be selected by WRR scheduler 410. Packets selected by WRR scheduler 410 for a particular group of queues 420 may be assembled into a stream.

WRR weight calculator 430 may include hardware or a combination of hardware and software that may calculate WRR weights. WRR weight calculator 430 may calculate WRR weights based on information, such as, for example, bandwidth available with respect to line interfaces 230, the type of network traffic (e.g., voice, data, real-time data, non-real-time data, etc.) serviced by network device 200, priority preferences with respect to the type of network traffic, the size of the buffers with which queues 420 may be associated, particular user configurations (e.g., a user configuration file), and/or other types of network-based information (e.g., latency parameters, delay parameters, jitter parameters, Quality of Service (QoS) parameters, etc.). The WRR weights may be specified as relative percentages, such as an actual number of packets to be transmitted during each iteration or as a byte count to be transmitted.

Although FIG. 4 illustrates exemplary components of PPE 300, in other implementations, PPE 300 may include fewer, different, differently arranged, or additional functional components than those depicted in FIG. 4. For example, in other implementations, PPE 300 may not include WRR scheduler 410, queues 420, and/or WRR weight calculator 430. Rather, one or more of these components may reside elsewhere in network device 200. Additionally, or alternatively, one or more operations described as being performed by a particular component may be performed by one or more other components, in addition to or instead of the particular component.

Figure 5:
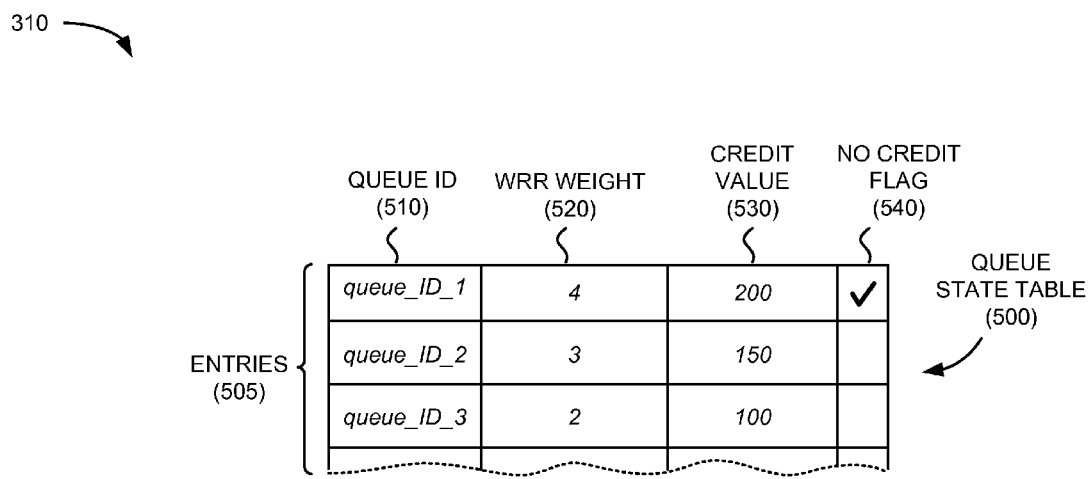
FIG. 5 is a diagram illustrating an exemplary queue state table within the memory of FIG. 3.

FIG. 5 is a diagram illustrating exemplary data of data memory 310. As illustrated, queue state table 500 may include multiple entries 505, each of which may include a queue ID field 510, a WRR weight field 520, a credit value field 530, and a "no credit" flag field 540. Queue ID field 510 may uniquely identify a queue 420 (e.g., queue 420-0, 420-1, . . . 420-X) in the WRR grouping. WRR weight field 520 may indicate WRR weight values corresponding to queues 420-0 through 420-X. Credit value field 530 may identify an assigned credit value corresponding to queues 420-0 through 420-X. Although entries for credit value field 530 are shown as numbers in FIG. 5, in other implementations, entries for credit value field 530 may be included as a function (e.g., a function of available bandwidth for the WRR scheduler, WRR weight, and/or a time slot). "No credit" flag field 540 may include a flag that identifies whether credits should be added for the next iteration of WRR. For example, a mark in "no credit" flag field 540 associated with a first queue in queue state table 500 may indicate that the credit value (e.g., "200") for the first queue will not be applied during the next WRR iteration.

Although FIG. 5 illustrates an exemplary queue state table 500, in other implementations, queue state table 500 may include less, different, differently arranged, or additional information than depicted in FIG. 5. Additionally, or alternatively, in other implementations, data memory 310 may not include queue state table 500. Rather, queue state table 500 may reside elsewhere in network device 200.

Exemplary Process

Figure 6:
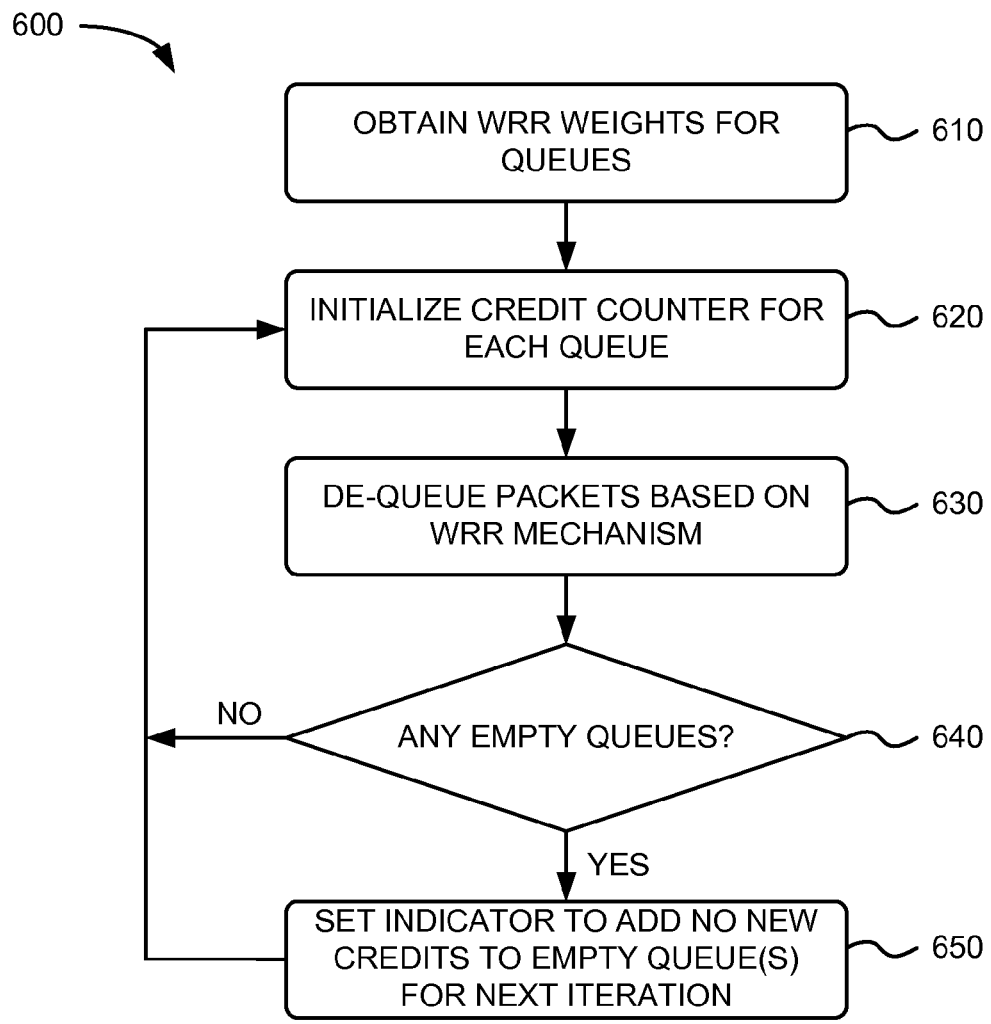
FIG. 6 is a flow diagram illustrating an exemplary process for avoiding unfair advantage in packet scheduling with empty queues in a WRR environment.

FIG. 6 is a diagram illustrating an exemplary process 600 for avoiding unfair advantage in packet scheduling with empty queues in a WRR environment. Process 600 may be performed by one or more components of network device 200. For example, the WRR scheduling architecture of network device 200, as illustrated in FIGS. 3-5, and described herein, may perform one or more of the operations associated with process 600.

Process 600 may include obtaining WRR weights for multiple queues (block 610). For example, WRR scheduler 410 may retrieve from data memory 310 (e.g., queue state table 500) WRR weights associated with one or more queues 420. The WRR weights associated may be based on, for example, network information such as bandwidth available with respect to line interfaces 230, the type of network traffic (e.g., voice, data, real-time data, non-real-time data, etc.) serviced by network device 200, priority preferences with respect to the type of network traffic, the size of the buffers with which queues 420 may be associated, and/or other types of network-based information (e.g., latency parameters, delay parameters, jitter parameters, QoS parameters, etc.). The WRR weights may be provided to data memory 310 by, for example, WRR weight calculator 430.

Credit counters for each queue may be initialized (block 620). For example, WRR scheduler 410 may set values for each of credit counters 415 based on the WRR weights assigned in queue state table 500. In one implementation, the value for each credit counter may be set to a particular byte-per-interval value based on a maximum byte-per-interval value (e.g., 1000 bytes/10 milliseconds). In another implementation, such as when packet sizes may be relatively constant, the value for each credit counted may be set to a particular number of packets.

Packets may be de-queued based on the WRR mechanism (block 630). For example, WRR scheduler 410 may forward packets from queues 420 to a scheduled packet stream for downstream processing by another component of network device 200. WRR scheduler 410 may determine the size of each packet extracted from queues 420 and decrement the credit counter 415 associated with the queue by the packet size.

It may be determined whether an empty queue is encountered (block 640). For example, WRR scheduler 410 may determine whether one of queues 420 becomes empty during application of the WRR mechanism. A queue may be considered empty, for example, when no packets remain in a particular queue 420 when WRR scheduler 410 attempts to extract packets from that particular queue 420 for placement into the scheduled packet stream. If one or more of queues 420 becomes empty, WRR schedule 410 may zero out any remaining credit count associated with the empty queue 420 and proceed with assigning packets from other remaining queues 420 that have positive credit count values.

If it is determined that there is an empty queue (block 640—YES), an indicator may be set for the empty queue to add no new credits for the next WRR iteration (block 650). For example, WRR scheduler 410 may detect an empty queue 420 during scheduling by identifying removal of the last packet of queue 420. Alternatively, WRR scheduler 410 may identify a queue 420 for which a remaining credit counter value exists, but no packets are currently in the particular queue 420. WRR scheduler 410 may set a flag (e.g., an entry in "no credit" flag field 540 for the particular queue) for the credit counter 415 associated with the empty queue 420 to indicate that no credits should be applied to the empty queue 420 during the next WRR iteration. Process 600 may then proceed to block 620 to initialize credit counters for the next WRR iteration, where WRR scheduler 410 may recognize the empty queue flag and apply no credits to the empty queue 420, regardless of the WRR weight value assigned in queue state table 500.

Similarly, if it is determined that there is not an empty queue (block 640—NO), process 600 may then proceed to block 620 to initialize credit counters for the next WRR iteration, where WRR scheduler may apply credits to each of queues 420 based on the WRR weight values assigned in WRR table 500.

In an exemplary implementation, process 600 may be configured to process each queue completely before proceeding to another queue. For example, process blocks 630, 640, and 650 above may be applied to an individual queue before proceeding to another queue. In such an implementation, credit values for each queue may be resolved only once per WRR cycle for a group of queues. Credit values for each queue may be stored in static RAM (SRAM) or a low power register array (LPRA), which may be very area efficient in contrast with, for example, a bi-stable (flip-flop) memory circuit. Thus, process 600 may provide a highly scalable solution that may effectively schedule a large number of queues. Implementations of process 600 are described further in the following examples.

Examples

Figure 7:
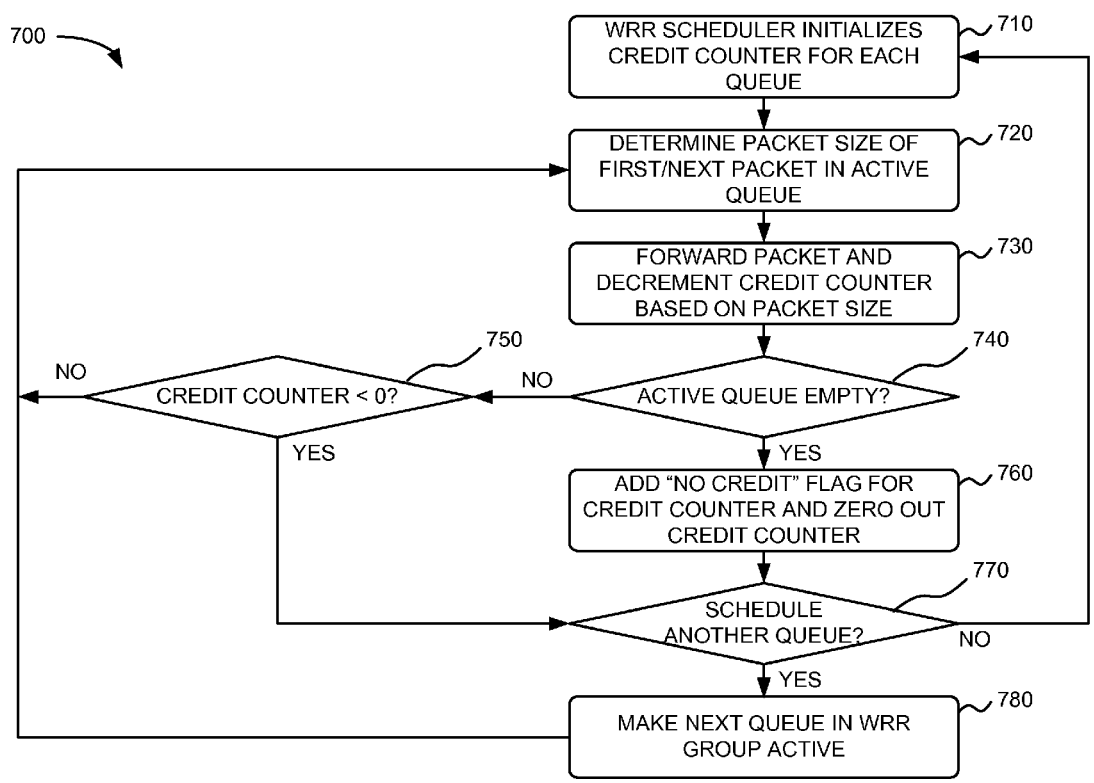
FIGS. 7 and 8 are flow diagrams illustrating particular examples of implementing WRR scheduling according to implementations described herein.

FIG. 7 is a flow diagram illustrating a particular example of implementing WRR scheduling according to an implementation described herein. Assume the process of FIG. 7 applies to a three queue configuration, where three output queues $Q_1$, $Q_2$, and $Q_3$ have relative weights of 3, 1, and 1 respectively. Further, an exemplary time interval of 10 ms is identified during which a predetermined maximum (MAX) number of bytes (e.g., 5000 bytes) are transmitted on a physical link. Each of the output queues $Q_1$, $Q_2$, and $Q_3$ share the available bandwidth (bytes/interval or 5000 bytes/10 ms) based upon their respective weighting. For the above example, this would amount to 3000 bytes/interval for $Q_1$, 1000 bytes/interval for $Q_2$, and 1000 bytes/interval for $Q_3$. For purposes of the example of FIG. 7, cumulative byte amounts of packets stored in queues $Q_1$, $Q_2$, and $Q_3$ are assumed to be 2500 bytes each. Process 700 shows all applicable packets from each queue being scheduled in a sequential fashion.

As shown in FIG. 7, process 700 may include packet scheduler (e.g., WRR scheduler 410) initializing credit counters (e.g., credit counters 415) for each of queues $Q_1$, $Q_2$, and $Q_3$ (block 710). For $Q_1$, initialization in this example means setting the credit counter equal to 3000 bytes or 60% of the available bandwidth. For $Q_2$ and $Q_3$, the credit counters are each set to 1000 bytes or 20% of the available bandwidth, respectively. Next, the packet scheduler may determine the size of the next available packet in $Q_1$ (block 720). The packet scheduler may forward the packet to a downstream processing engine and decrement the $Q_1$ credit counter by the size of the forwarded packet (block 730). For example, if the size of the packet to be forwarded is 100 bytes, the $Q_1$ credit counter would be decremented from 3000 to 2900 bytes.

The packet scheduler may determine whether the active queue is empty (block 740). If the active queue is not empty (block 740—NO), the packet scheduler may also determine if the credit counter is less than zero (block 750). If the credit counter is not less than zero, process 700 may return to block 720. In other words, the packet scheduler may continue to determine the size of subsequent packets from $Q_1$, forward the packets, and decrement the $Q_1$ credit counter until the $Q_1$ credit counter becomes negative or until no more packets are available from $Q_1$. Because, in the present example, $Q_1$ has a starting byte size of 2500 bytes (and it is assumed no incoming packets arrive during the scheduling), $Q_1$ will become empty before the $Q_1$ credit counter (set initially to 3000) becomes negative.

If the packet scheduler determines that the active queue is empty (block 740—YES), the packet scheduler may add a "no credit" flag for the counter associated with the active queue and zero out the credit counter for the active queue (block 760). Thus, after the packet scheduler determines that no more packets are available from $Q_1$, the packet scheduler may zero out the remaining credit count value (e.g., 500) and add a flag to indicate that no credits should be added to the $Q_1$ credit counter for the next WRR iteration.

It may then be determined if there is another queue to schedule (block 770). For example, once the packet scheduler determines that $Q_1$ is empty, the packet scheduler may determine if $Q_2$ and/or $Q_3$ have packets to schedule. If there is another queue to schedule (block 770—YES), the next queue in the WRR group may be made active (block 780). For example, $Q_2$ may be considered the next active queue, and process 700 may proceed to forward packets from $Q_2$. Since $Q_2$, in this example, has a byte volume (e.g., 2500 bytes) that exceeds the $Q_2$ credit count (1000), the packet scheduler will not encounter an empty $Q_2$. Thus, process 700 may proceed through blocks 720 through 750 and eventually to block 770 for $Q_2$. Similarly, since $Q_3$, in this example, has a byte volume (e.g., 2500 bytes) that exceeds the $Q_3$ credit count (1000), the packet scheduler will not encounter an empty $Q_3$. Thus, process 700 may proceed through blocks 720 through 750 and eventually to block 770 for $Q_3$.

If there is not another queue to schedule (block 770—NO), process 700 may return to block 710 to proceed to the next iteration of WRR. In the present example, the $Q_1$ credit counter will be initialized to zero, the $Q_2$ credit counter will be initialized to 1000 and the $Q_3$ credit counter will be initialized to 1000. In one implementation, the initialization procedure of block 710 may also include clearing any "no credit" flags after each queue is initialized. Assuming $Q_1$ has received packets to be forwarded in the interval since the previous WRR iteration, packet scheduler may decrement the $Q_1$ credit counter to a negative value as soon as the first packet is removed from $Q_1$. Thus, process 700 may proceed from blocks 720 through 750 and immediately to block 770 for $Q_1$ in the second iteration. Because the packet scheduler did not need to determine whether $Q_1$ was empty after the single packet was removed, a "no credit" flag would not be added to $Q_1$. The second WRR iteration process for $Q_2$ and $Q_3$ will proceed in a manner similar to the first iteration, as each of $Q_2$ and $Q_3$ will still have a value (e.g., 1500) that exceeds the credit count (e.g., 1000) for each of those queues.

Eventually, process 700 may continue to a third WRR iteration. In the third iteration, according to the present example, $Q_1$ would again be assigned a full credit count value of 3000, while $Q_2$ and $Q_3$ would again be assigned full credit count value of 1000 each.

Figure 8:
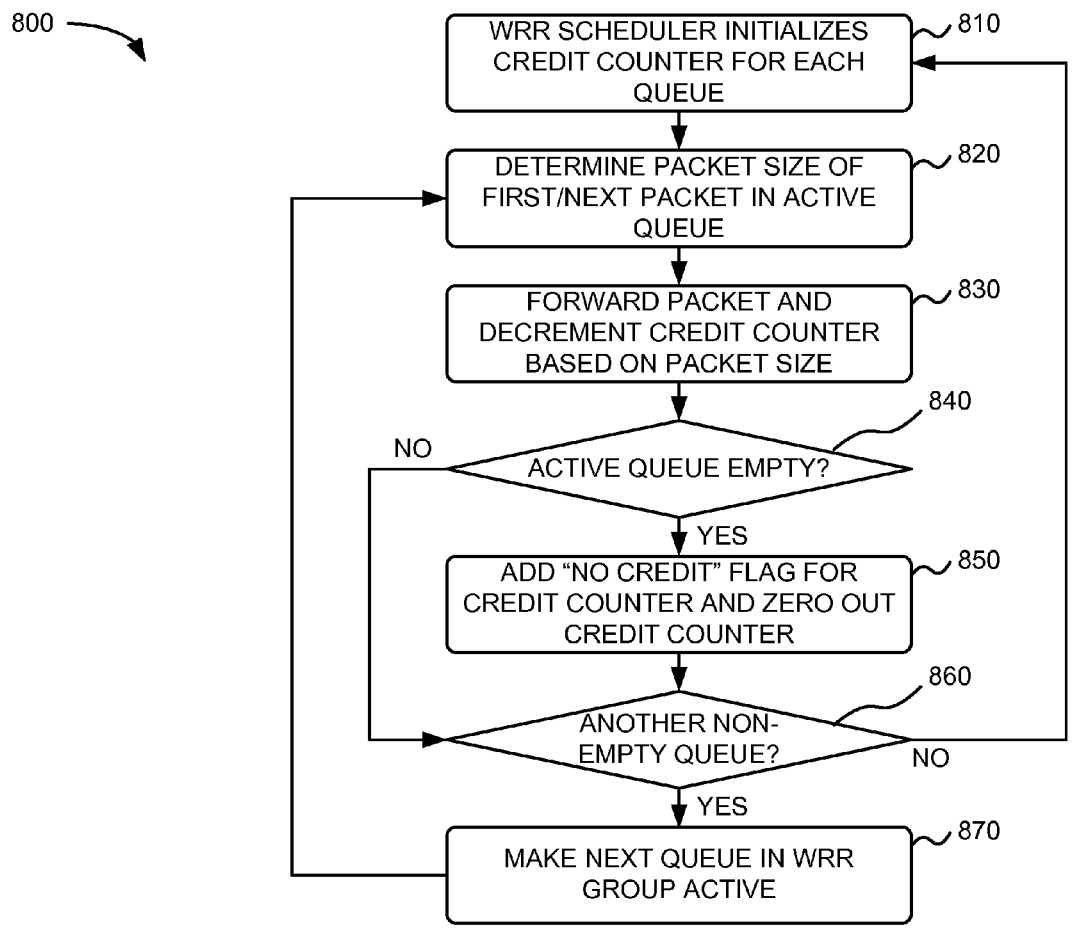

FIG. 8 is a flow diagram illustrating another particular example of implementing WRR scheduling according to an implementation described herein. Similar to the example of FIG. 7, assume process 800 of FIG. 8 applies to a three queue configuration, where three output queues $Q_1$, $Q_2$, and $Q_3$ have relative weights of 3, 1, and 1 respectively. Further, an exemplary time interval of 10 ms is identified during which a predetermined maximum (MAX) number of bytes (e.g., 5000 bytes) are transmitted on a physical link. Each of the output queues $Q_1$, $Q_2$, and $Q_3$ share the available bandwidth (bytes/interval or 5000 bytes/10 ms) based upon their respective weighting. For the above example, this would amount to 3000 bytes/interval for $Q_1$, 1000 bytes/interval for $Q_2$, and 1000 bytes/interval for $Q_3$. For purposes of the example of FIG. 8, assume each of $Q_1$, $Q_2$, and $Q_3$ includes eight (8) packets of 400-byte packets (i.e., 3200 total bytes each). Process 800 shows packets from each queue being scheduled in a round-robin fashion.

As shown in FIG. 8, process 800 may include a packet scheduler (e.g., WRR scheduler 410) initializing credit counters (e.g., credit counters 415) for each of queues $Q_1$, $Q_2$, and $Q_3$ (block 810). For $Q_1$, initialization in this example means setting the credit counter equal to 3000 bytes or 60% of the available bandwidth. For $Q_2$ and $Q_3$, the credit counters are each set to 1000 bytes or 20% of the available bandwidth, respectively. Next, the packet scheduler may determine the size (e.g., 400 bytes) of the next available packet in $Q_1$ (block 820). The packet scheduler may forward the packet to a downstream processing engine and decrement the $Q_1$ credit counter by the size of the forwarded packet (block 830). For example, since the size of the packets to be forwarded in this example is 400 bytes, the $Q_1$ credit counter would initially be decremented from 3000 to 2600 bytes.

The packet scheduler may determine whether the active queue is empty (block 840). For example, the packet schedule may determine if previously forwarded packet was the last packet in queue $Q_1$. If the active queue is not empty (block 840—NO), it may then be determined if there is another non-empty queue to schedule (block 860). In the present example, after decrementing the $Q_1$ to 2600 bytes, the packet scheduler may determine if another non-empty queue has a positive credit count. If there is another non-empty queue to schedule (block 860—YES), then the packet scheduler may make the next queue in the WRR group active (block 870). In the present example, Q2 may be considered the next active queue, and process 800 may proceed to block 820 to repeat the above process and eventually forward a 400-byte packet from $Q_2$ (causing the $Q_1$ credit counter to initially be decremented from 1000 to 600 bytes).

Returning to block 840, if it is determined that the active queue is empty (block 840—YES), the packet scheduler may add a "no credit" flag for the counter associated with the active queue and zero out the credit counter for the active queue (block 850). In the example of FIG. 8, the scheduling of the eighth (and last) 400-byte packet in $Q_1$ would cause the $Q_1$ credit counter to reach a negative value (e.g., −200). The packet scheduler may determine that no more packets are available from $Q_1$, may zero out the negative credit count value (e.g., −200), and may add a flag to indicate that no credits should be added to the $Q_1$ credit counter for the next WRR iteration. The process may then proceed to block 860 described above. In the present example, $Q_1$ would empty after the credit count of $Q_2$ and $Q_3$ had already reached a negative count. Thus, the packet scheduler may then proceed to block 810 to start another WRR iteration.

CONCLUSION

Implementations described herein may provide systems and/or methods that perform a first WRR scheduling iteration including processing of at least one packet from a particular queue in a group of queues. The systems and methods may also identify the particular queue as an empty queue during the performing of the first WRR scheduling iteration and may later identify the particular queue as a non-empty queue after the identifying of the particular queue as the empty queue. The systems and/or methods may then perform a second WRR scheduling iteration including processing of only one packet of multiple of packets from the particular queue of the multiple queues.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6 and 7, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   initializing, by a network device, credit counters for a plurality of queues;
   performing, by the network device, weighted round-robin (WRR) scheduling of packets from one of the plurality of queues;
   identifying, by the network device, that the one of the plurality of queues is empty while performing the WRR scheduling; and
   setting, by the network device, an indicator to indicate that no credits should be added to a credit counter, of the credit counters, associated with the one of the plurality of queues during a subsequent initializing of the credit counters.

2. The method of claim 1, where the network device corresponds to a switch or a router.

3. The method of claim 1, further comprising:
   zeroing out a value of the credit counter associated with the one of the plurality of queues;
   performing, based on the indicator, the subsequent initializing of the credit counters by adding credits to all other credit counters, of the credit counters associated with other ones of the plurality of queues, for the all other credit counters to be initialized to one or more values greater than zero; and
   performing a subsequent WRR scheduling of packets that includes scheduling a single packet from the one of the plurality of queues.

4. The method of claim 1, where initializing the credit counters includes:
   obtaining WRR weights associated with the plurality of queues, and
   initializing the credit counters based on the WRR weights.

5. The method of claim 1,
   where performing the WRR scheduling of packets from the one of the plurality of queues includes:
       forwarding a packet from the one of the plurality of queues, and
       decrementing the credit counter, associated with the one of the plurality of queues, by a value associated with the forwarded packet, and
   where the method further comprises:
       determining that the credit counter is equal to less than zero after decrementing the credit counter and determining that the one of the plurality of queues is empty; and
       zeroing out the credit counter after determining that the credit counter is equal to less than zero.

6. The method of claim 5, where the value associated with the forwarded packet is based on one of:
   a size of the packet, or
   a constant value.

7. The method of claim 1, where the indicator is included within a queue status table.

8. The method of claim 1, further comprising:
   storing, after identifying that the one of the plurality of queues is empty, additional packets in the one of the plurality of queues.

9. A network device comprising:
   one or more processors to:
       perform a first weighted round-robin (WRR) scheduling iteration that includes processing of at least one packet from a particular queue of a plurality of queues;
       determine that the particular queue is empty while performing the first WRR scheduling iteration;
       set, after determining that the particular queue is empty, an indicator to indicate that no credits should be added to a credit counter, associated with the particular queue, during a second WRR scheduling iteration;
       add a plurality of packets to the particular queue after determining that the particular queue is empty;
       determine that the particular queue is not empty after adding the plurality of packets to the particular queue; and
       perform, based on the indicator, the second WRR scheduling iteration by processing only one packet of the plurality of packets in the particular queue.

10. The network device of claim 9, where the one or more processors are further to:
    perform a third WRR scheduling iteration by processing at least one other packet of the plurality of packets in the particular queue.

11. The network device of claim 9, where, when performing the first WRR scheduling iteration, the one or more processors are further to:
calculate WRR weights based on at least one of available bandwidth or types of network traffic associated with the plurality of queues,
initialize credit counters associated with the plurality of queues based on the WRR weights, and
perform the first WRR scheduling iteration based on the credit counters.

12. The network device of claim 9, further comprising:
a memory to store:
information that identifies the plurality of queues, and
the indicator.

13. The network device of claim 9, where the network device includes one of a router or a switch.

14. The network device of claim 9, where the one or more processors include a packet processing engine.

15. The network device of claim 9, where, when performing the first WRR scheduling iteration, the one or more processors are further to:
process a particular packet of the at least one packet from the particular queue, and
decrement the credit counter, associated with the particular queue, by a particular value associated with the particular packet,
the particular value being based on a size of the particular packet or a constant value.

16. A non-transitory computer-readable medium storing instructions, the instructions comprising:
one or more instructions that, when executed by at least one processor, cause the at least one processor to:
initialize a credit counter for a particular queue, of a plurality of queues, based on an assigned weighted round-robin (WRR) weight for the particular queue,
the particular queue including one or more packets to be scheduled for processing;
schedule the one or more packets from the particular queue based on the credit counter;
identify that the particular queue is empty;
set an indicator to indicate that no credits should be added to the credit counter during a subsequent initializing of the credit counter; and
perform, based on the indicator, the subsequent initializing of the credit counter for the particular queue.

17. The non-transitory computer-readable medium of claim 16, the instructions further comprise:
one or more instructions to:
decrement the credit counter for the queues based on the scheduling of the one or more packets.

18. The non-transitory computer-readable medium of claim 17,
where the one or more instructions to perform the subsequent initializing of the credit counter for the particular queue include:
one or more instructions to zero out the credit counter for the particular queue, and
where the instructions further comprise:
one or more instructions to:
identify that additional packets have been received at the particular queue after identifying that the particular queue is empty; and
schedule, based on the credit counter, only a single packet, of the additional packets, from the particular queue after zeroing out the credit counter.

19. The non-transitory computer-readable medium of claim 16,
where the one or more instructions to schedule the one or more packets include:
one or more instructions to:
forward the one or more packets,
decrement the credit counter by one or more values associated with the one or more packets,
identify that the credit counter has a non-zero value after decrementing the credit counter and identifying that the particular queue is empty, and
zero out the credit counter after identifying that the credit counter has a non-zero value.

* * * * *